United States Patent
Ramanjani

(10) Patent No.: US 12,218,588 B2
(45) Date of Patent: Feb. 4, 2025

(54) FRONT-END ARCHITECTURE FOR A LOW-VOLTAGE POWER SUPPLY SYSTEM

(71) Applicant: Hamilton Sundstrand Corporation, Charlotte, NC (US)

(72) Inventor: Shobha Ramanjani, Bangalore (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 272 days.

(21) Appl. No.: 17/896,864

(22) Filed: Aug. 26, 2022

(65) Prior Publication Data

US 2023/0060456 A1    Mar. 2, 2023

(30) Foreign Application Priority Data

Aug. 27, 2021  (IN) .............................. 202141038946

(51) Int. Cl.
*H02M 3/158* (2006.01)
*H02M 1/00* (2006.01)
*H02M 3/155* (2006.01)

(52) U.S. Cl.
CPC ....... *H02M 3/1557* (2021.05); *H02M 1/0096* (2021.05); *H02M 3/158* (2013.01)

(58) Field of Classification Search
CPC ..... H02M 1/0096; H02M 3/557; H02M 3/158
See application file for complete search history.

(56) References Cited

U.S. PATENT DOCUMENTS

| | | | |
|---|---|---|---|
| 5,786,685 A | 7/1998 | Lange et al. | |
| 6,366,474 B1 | 4/2002 | Gucyski | |
| 6,504,497 B2 | 1/2003 | Jang et al. | |
| 7,729,143 B2 | 6/2010 | Lin et al. | |
| 8,179,698 B2 | 5/2012 | Jang et al. | |
| 8,710,820 B2 | 4/2014 | Parker | |
| 11,095,118 B2 * | 8/2021 | Humayun | ............. H02J 7/0063 |
| 2006/0039172 A1 | 2/2006 | Soldano | |
| 2009/0206657 A1 | 8/2009 | Vuk et al. | |
| 2012/0044722 A1 | 2/2012 | Cuk | |
| 2013/0051101 A1 | 2/2013 | Cao et al. | |
| 2013/0285449 A1 | 10/2013 | Schmidt et al. | |

OTHER PUBLICATIONS

Extended European Search Report, of the European Patent Office, dated Jan. 23, 2023, in corresponding European Patent Application No. 22192556.3.

* cited by examiner

*Primary Examiner* — Gary L Laxton

(57) ABSTRACT

A front-end architecture system includes a system voltage input and a controller electrically connected to the system voltage input. The controller is configured and adapted to provide a voltage output to at least one controller output. The controller includes a single-ended primary-inductor converter (SEPIC) and a monitoring and switchover circuit. A method for controlling a voltage input to a low-voltage power supply (LVPS) includes receiving a system voltage input with a controller, wherein the controller includes a single-ended primary-inductor converter (SEPIC) and a monitoring and switchover circuit. The method includes providing a voltage output of the controller to at least one controller output. The method includes receiving the voltage output with a low-voltage power supply (LVPS) electrically connected to the at least one controller output.

20 Claims, 2 Drawing Sheets

FRONT-END ARCHITECTURE FOR A LOW-VOLTAGE POWER SUPPLY SYSTEM

CROSS-REFERENCE TO RELATED APPLICATION

This application claims priority to and the benefit of Indian Provisional Patent Application No. 202141038946, filed Aug. 27, 2021, the entire contents of which is being incorporated herein by reference in its entirety.

BACKGROUND OF THE INVENTION

1. Field of the Invention

The present disclosure relates to low voltage power supply circuits and more particularly to circuitry used to generate the low voltage fed thereto.

2. Description of Related Art

Aircraft LRUs (Line Replaceable Units) use 28V DC aircraft supply to derive the low voltage required to power sub-system circuitry. Usually LVPS (Low Voltage Power Supply) circuits are used to derive the low voltage interface with multi-output buck/boost converters as the 28V DC aircraft varies from 12V to 80V based on the different category of the LRUs defined considering all normal and abnormal variations. The 28V DC aircraft supply is characterized with power interrupts with various durations and transients. Hence, the LVPS should be able to operate with the transients up to 80V. Also LVPS should be able to operate without any degradation for specified time even there is an interrupt in the 28V DC supply. Irrespective of 28V DC supply characteristics, the LVPS is required to provide regulated output for the required duration.

The above requirements can be met through LVPS architecture having a hold-up capability of providing the required hold-up time by storing the energy from the 28V DC supply. Hold-up time refers to the duration of the input supply available to the LVPS for its operation with specified regulated outputs upon the Aircraft 28V DC interrupts. The hold-up time requirement will vary from 10 ms to 200 ms depending on the category of the LRU and safety critical applications requirements. The LVPS should also be capable to handle the specified input voltage transients with durations. There are various ways the LVPS is implemented to meet these requirements. Mainly for the transients, the LVPS is made to handle these transients by design with higher rating components and with dynamic response. For the hold-up time requirements in traditional systems, the 28V DC is boosted and stored with bulk of storage capacitors. To boost and store the energy, conventional boost regulators converters are used in the front-end of the LVPS or flyback converter used for LVPS is made to provide and additional high voltage output, through which the hold-up capacitor is made to charge and discharge with an additional circuitry. The flyback energy to charge the hold-up capacitor with an additional circuitry like voltage doublers and regulators. All these schemes adds complex circuitry, also utilizes most of the LVPS space and increases the cost.

Conventional methods of boosting voltage to store for longer duration using boost converters makes the circuit complex, and may not limit the transients more than the rated output voltage. For example, the 80V transients will bypass through boost converter if it is designed to provide an output voltage of 50V. Conventional methods of boosting voltage cannot generally handle the output short circuits unless the input current is monitored and required protection is been provided. Conventional flyback converters add extra components as transformers to provide the boosted voltage, also adds complex control circuit to achieve this. Additionally, to achieve the required high voltage to store the energy through the conventional methods, additional circuitry such as regulators, comparators, voltage monitors and switch over circuits are required and add complexity, size and even cost of the power supply.

There are various techniques used to manage the 28V DC supply abnormalities including various hold-up schemes, such as: conventional boost front-end architecture, boost and hold up extension circuits with switchover circuits, flyback converters with primary reflected voltage for the hold-up, and/or flyback converters with extra output to for the hold up. A conventional boost converter generally includes a controller, a switching circuit and an inductor associated with storage capacitors to provide the regulated high voltage output. The voltage is boosted to reduce the storage capacitors size and to provide the required hold-time. Voltage to be boosted is also limited to some extent, due to the cost of the storage capacitors. It is also required that the voltage is stepped down before connecting to LVPS as an input voltage. This boost converter is generally in front-end or added in parallel to LVPS input with switchover circuit which manages to switch the boosted voltage whenever there is an interrupt in the 28V DC supply. Generally, some drawbacks of the boost converters are: complex circuitry with controller and compensation networks, as the boosting voltage output is limited, high voltage transients such as 80V cannot be handled; the boost converter circuit cannot handle short circuited output and additional circuits or extra components at the input may be required to provide protection over short circuited outputs; increased size and cost of the circuitry. The boost and hold-up extension circuits with switchover logic are similar to the boost converter described above with additional magnetics and storage elements to extent the hold-up time. This architecture has similar limitations to those identified above, increasing the complexity and cost of the circuit. For flyback converters with primary reflected voltage for the hold-up, the reflected primary voltage is boosted and regulated with additional circuitry and a storage capacitors will be connected across this to store the energy. This stored energy is generally connected to the input of the LVPS through switch over logic based on the power interrupt in the primary supply. Flyback converters with primary reflected voltage can generally add extra circuitry which can be more complex than the boost converter to increase and regulate the reflected voltage. Additional circuitry may be required to charge and discharge the storage capacitors. Additionally, depending on the flyback converter, any problems associated with the flyback converter will degrade the energy storing capacity. Ultimately, the flyback converters with primary reflected voltage result in increased size, costs and complexity of the circuitry. LVPS with flyback converters can also include additional high voltage output for the hold-up. The flyback converter will generate an additional output in particular for hold-up energy storage, which will be of high voltage output generated using extra winding incorporating with the flyback transformer. This is similar to the above mentioned flyback converter with primary reflected voltage method having the same limitations, the additional winding voltage is boosted to be regulated with additional circuitry and a storage capacitors will be connected across this to store the energy. It also adds an extra winding on the transformer which can make the transformer design and circuitry complex.

As stated, there are various challenges in implementing the required hold-up and transient handling circuits for the aircraft sub-system LVPS. The conventional techniques have been considered satisfactory for their intended purpose. However, there is an ever present need for improved front-end LVPS architecture to provide the supply for the required duration, even during unavailability of 28V DC supply, to provide a safer more efficient sub-system. This disclosure provides a solution for this need.

SUMMARY

A front-end architecture system includes a system voltage input and a controller electrically connected to the system voltage input. The controller is configured and adapted to provide a voltage output to at least one controller output. The controller includes a single-ended primary-inductor converter (SEPIC) and a monitoring and switchover circuit.

In certain embodiments, at least one controller output includes two controller outputs. A first controller output of the two controller outputs can be a SEPIC output. The SEPIC output can be electrically coupled to a storage capacitor. The SEPIC output can be electrically connected to a series pass switch through which a SEPIC output voltage can be configured and adapted to a low-voltage power supply (LVPS). A second controller output of the two controller outputs can be in electrical communication with a second voltage output line. The second voltage output line can include a switch connected in series between the second controller output and an LVPS input. The switch can be in electrical communication with the monitoring and switchover circuit between the system voltage input and the LVPS.

The monitoring and switchover circuit can be electrically coupled to the system voltage input to monitor the voltage at the system voltage input. The monitoring and switchover circuit can be configured and adapted to feed an input voltage at the system voltage input ranging from 12 to 50V to the LVPS. The monitoring and switchover circuit can be configured and adapted to feed an input voltage at the system voltage input of greater than 50V and up to less than 80V to the SEPIC. The SEPIC can be configured and adapted to convert the input voltage to a fixed 50V output. The monitoring and switchover circuit can be configured and adapted to disconnect the system voltage input during a transient scenario. The transient scenario can include when a voltage at the system voltage input is below 12 volts or 80 volts and greater. The SEPIC can include a SEPIC controller, a MOSFET electrically connected to a modulated output of the SEPIC controller, an inductor electrically connected downstream from the MOSFET, and a diode downstream from the inductor. The input monitoring and switchover circuit can include at least one NPN transistor, and at least one PNP transistor. The PNP transistor can be configured and adapted to be used for sensing an input voltage and turning ON/OFF at least one series pass MOSFET.

In accordance with another aspect, a method for controlling a voltage input to a low-voltage power supply (LVPS) includes receiving a system voltage input with a controller, wherein the controller includes a single-ended primary-inductor converter (SEPIC) and a monitoring and switchover circuit. The method includes providing a voltage output of the controller to at least one controller output. The method includes receiving the voltage output with a low-voltage power supply (LVPS) electrically connected to the at least one controller output.

In some embodiments, the at least one controller output is a SEPIC output. The SEPIC output can be electrically coupled to a storage capacitor. Providing a voltage output of the controller to at least one controller output can include providing the voltage output to the SEPIC output. The method can include monitoring a voltage at the system voltage input with the monitoring and switchover circuit.

The at least one controller output can be in electrical communication with a controller voltage output line. The controller voltage output line can include a switch connected in series between the controller output and the LVPS. When a voltage at the system voltage input ranges from 12 to 50V the method can include feeding the voltage at the system voltage input to the controller voltage output line. When a voltage at the system voltage input is of greater than 50V and up to less than 80V the monitoring and switchover circuit can feed the voltage at the system voltage input to the SEPIC. The method can include converting the voltage at the system voltage input with the SEPIC to generate a fixed 50V output. The method can include connecting the system voltage input during a transient scenario with the monitoring and switchover circuit.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
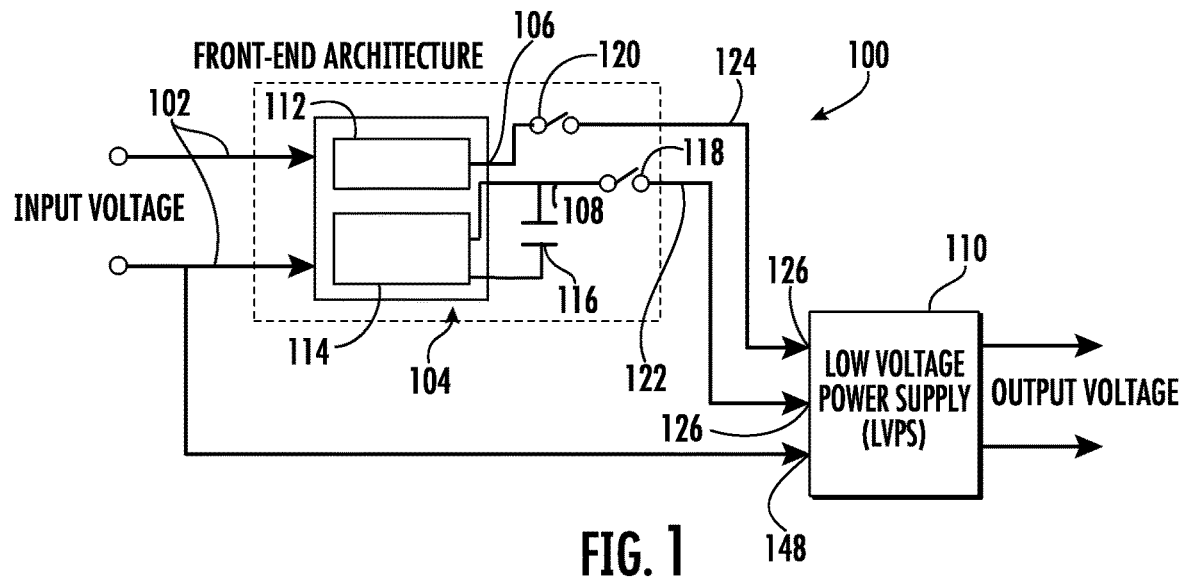
FIG. 1 is a schematic view of an embodiment of a low-voltage power supply (LVPS) system constructed in accordance with the present disclosure, showing a controller having a single-ended primary-inductor converter (SEPIC) and a monitoring and switchover circuit.

Reference will now be made to the drawings wherein like reference numerals identify similar structural features or aspects of the subject disclosure. For purposes of explanation and illustration, and not limitation, a schematic view of an exemplary embodiment of the front-end architecture system in accordance with the disclosure is shown in FIG. 1 and is designated generally by reference character 100. Other embodiments of the front-end architecture in accordance with the disclosure, or aspects thereof, are provided in FIGS. 2-3 as will be described. The systems and methods described herein can be used to provide a simple, smaller and more independent front-end architecture for aircraft sub-system LVPS with short-circuit protection and transient handling capability.

As shown in FIG. 1, a low-voltage power supply (LVPS) system 100 includes a system voltage input 102, a controller 104 electrically connected to the system voltage input 102, and a low-voltage power supply (LVPS) 110 electrically connected to two controller outputs 106 and 108. The controller 104 is configured and adapted to provide a voltage output to at least one of the two controller outputs 106 and 108 depending on an input voltage at system voltage input 102. The controller 104 includes a single-ended primary-inductor converter (SEPIC 114) and a monitoring and switchover circuit 112. System 100 is totally independent of the LVPS 110 and can be used with any of the LVPS 110 as a front-end architecture. In general, the system 100 is based on a 28V aircraft supply at voltage input 102 with transient voltage up to 80V and hold-up requirement that can vary from 10 ms to 200 ms. Previous techniques used for the hold-up scheme have challenges and limitations (mainly due to the complexity, size and cost). Also it might not fulfil the overall requirement such as transient handling and short circuit protection requirements, that needs additional circuits or to be handled by LVPS. Embodiments of the present disclosure, e.g. system 100, provide a simple, smaller and more independent front-end architecture for aircraft sub-system LVPS 110 with short-circuit protection and transient handling capability. This front-end architecture can be used with any of the aircraft sub-system LVPS. System 100 is configured and adapted to operate in the extended temperature range of −55° C. to +125° C.

As shown in FIG. 1, monitoring and switchover circuit 112 monitors the 28V input at voltage input 102 and connects the 50V SEPIC output 108 to LVPS 110 if an input voltage at voltage input 102 is below 12V and above 50V. Monitoring and switchover circuit 112 disconnects the 28V supply to LVPS during 80V transients, also at lower voltages, even during power interruptions. This results in the LVPS only seeing a range of voltage between 12 to 50V, all transients and 28V DC input abnormalities are limited through the front-end architecture circuit (controller 104). Specifically, the front-end SEPIC 114 handles all high voltage transients up to 80V by providing fixed 50V output even at 80V. Hence most of the LVPS component ratings can be reduced and also result in cost savings. As the front-end architecture (e.g. controller 104) uses SEPIC 114, it handles all the short circuit at the output with fold back protection.

With continued reference to FIG. 1, a first controller output 108 of the two controller outputs 106 and 108 is a SEPIC output 108 in electrical communication with a voltage output line 122. The input to an LVPS input 126 from voltage output line 122 is the modulated input from the SEPIC output 108. The SEPIC output 108 is electrically coupled to a storage capacitor 116. The SEPIC output 108 is electrically connected to a series pass switch 118 through which a SEPIC output voltage is provided to the LVPS 110. A second controller output 106 of the two controller outputs is in electrical communication with a second voltage output line 124. The second voltage output line 124 includes a switch 120 connected in series between the second controller output 106 and LVPS input 126. The input to LVPS input 126 from second voltage output line 124 is the unmodulated input from the 28V supply at input 102. The switch 120 is in electrical communication with the monitoring and switchover 112 circuit between the system voltage input 102 and the LVPS. The LVPS also includes a ground input 148.

Figure 2:
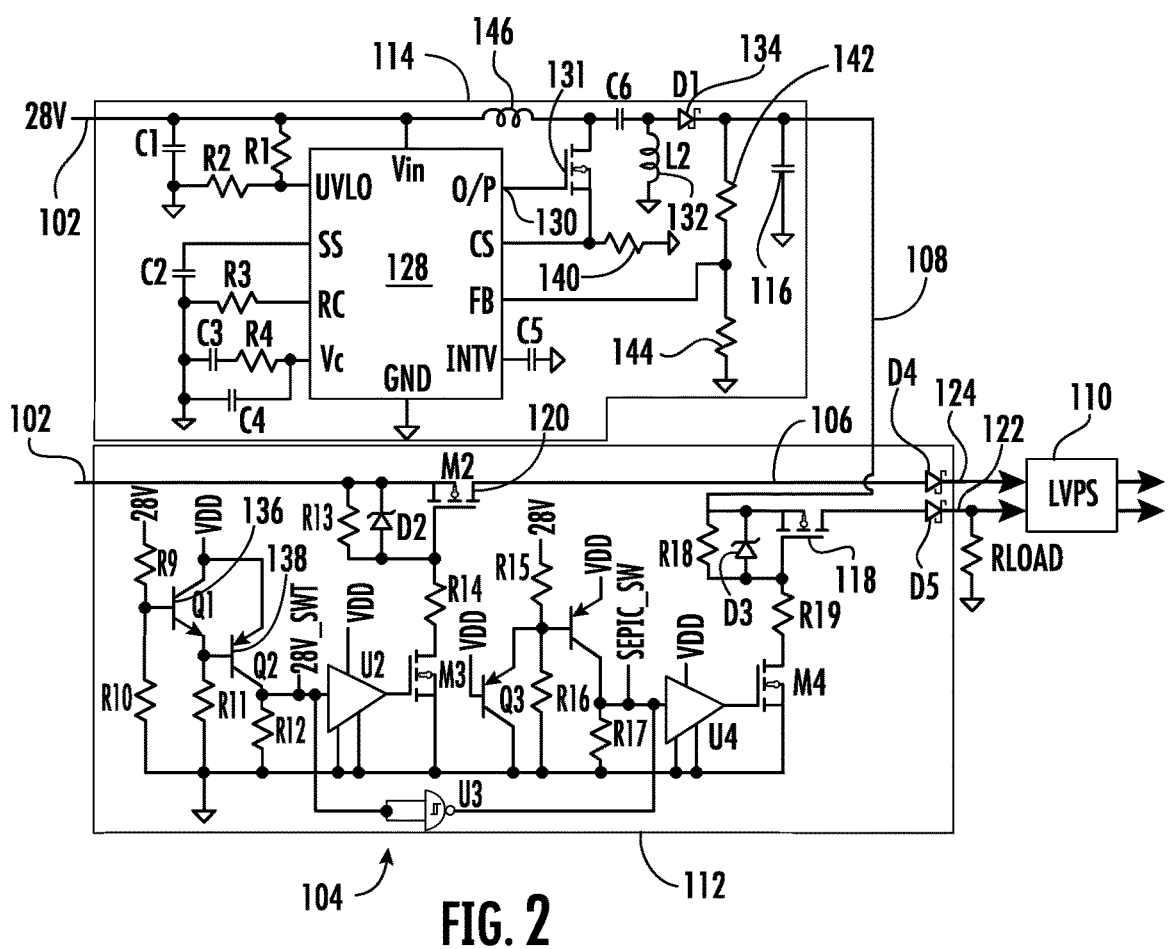
FIG. 2 is schematic view of the of the LVPS system of FIG. 1, showing the architecture of the SEPIC and the monitoring and switchover circuit.

As shown in FIGS. 1 and 2, the monitoring and switchover circuit 112 is electrically coupled to the system voltage input 102 to monitor the voltage at the system voltage input 102. The monitoring and switchover circuit 112 is configured and adapted to feed an input voltage at the system voltage input 102 ranging from 12 to 50V to the LVPS. The monitoring and switchover circuit 112 is configured and adapted to feed an input voltage at the system voltage input 102 of greater than 50V and up to less than 80V to the SEPIC 114. The SEPIC 114 is configured and adapted to convert the input voltage to a fixed 50V output at voltage output line 122. The monitoring and switchover circuit 112 is configured and adapted to disconnect the system voltage input 102 during a transient scenario. A transient scenario includes when a voltage at the system voltage input 102 is 80 volts and greater or when the voltage is below 12 volts. When the voltage at the system voltage input 102 is 80 volts and greater or below 12 volts, the monitoring and switchover circuit 112 disconnects system voltage input 102 by switching U3 and U4 ON to connect through M4 and M5. The SEPIC 114 is made up of only 4-5 major components such as SEPIC controller 128, a MOSFET 131 electrically connected to a modulated output 130 of the SEPIC controller 128, an inductor 132 electrically connected downstream from the MOSFET 131, and a diode 134 downstream from the inductor 132. This results in reduced complexity, reduced weight and reduced costs. SEPIC controller 128 includes a voltage input (Vin), a modulated output (O/P) 130, a under-voltage lockout (UVLO), a current sense input (CS), a feedback input (FB) to controller 128 (in the event there is any voltage variation), a feedback voltage input (Vc), a ground (GND), an input (RC) for providing feedback and stability, a soft start (SS) input, and a regulated voltage output (INTV), should it be needed.

As shown in FIG. 2, the input monitoring and switchover circuit 112 includes at least one NPN transistor 136, at least one PNP transistor 138 configured and adapted to be used for sensing an input voltage and turning series pass MOSFET 118 or series pass MOSFET 120 ON/OFF. This results in a simple monitoring and switchover circuit 112 as compared to traditional architecture. The requirement to monitor the low voltage such as 12V thresholds and high voltage 80V thresholds, and to turn ON/OFF the series pass MOSFETs are met with NPN transistor 136 and at least one PNP transistor 138 configured and adapted to be used for sensing an input voltage and turning series pass MOSFET 118 or series pass MOSFET 120 ON/OFF. The controller 104 is simple for voltage boosting as the controller 104 directly senses the MOSFET 131 current through a resistor 140 and does not need any filter, amplifier and demodulation circuits. The output voltage accuracy at SEPIC voltage outlet line 122 is also set through single divider network formed by resistor 142 and resistor 144 without any complexity.

Those skilled in the art will readily appreciate that system 100 does not need to generate precision reference voltages as needed for comparator circuits to monitor the inputs, only a set of fixed low voltage generation from the SEPIC output 108 are needed to bias the input voltage monitoring and switchover circuit 112. This eliminates most of the stages from the conventional hold-up circuitry such as startup regulator at the input, current sensing transformer, feedback circuitry, compensation network and under voltage lockout circuit, etc. System 100 also eliminates any charging, discharging and regulating schemes typically required when voltage is boosted with different schemes.

Those skilled in the art will readily appreciate that system 100 also provides overall protection by way of using a single SEPIC controller 128 which cannot be achieved through traditional circuit architecture, e.g., such as short circuit protection through a fold-back function. Additionally, if there is any short, the SEPIC output 108 limits the MOSFET switch 131 and inductor 146 current with limited duty-cycle based on the low voltage on the output which limits the current as well. This cannot be achieved by traditional boost front-end architecture. System 100 addresses power quality abnormalities of 28V aircraft supply before applying this to sub-system LVPS, which permit some power quality tests typically conducted as a part of qualification to be skipped by analysis of front-end architecture which shows compliance. This will reduce the cost involved in performing certain qualification processes. System 100 offers a wide range of voltage at voltage input 102 of the current mode controller is main advantage here to implement this architecture to cope up with the 28V aircraft supply variations. This eliminates most of the conventional methods of regulating, start-up circuitry etc. Additionally, system 100 does not require any special components; all the components used are easily available and no custom made components. All the components of system 100 selected are operational for the temperature range of −55° C. to +125° C. and hence this front-end architecture can be used with any of the aircraft LVPS category including military categories.

In accordance with another aspect, a method for controlling a voltage input to a low-voltage power supply (LVPS), e.g. LVPS 110, includes receiving a system voltage input with a controller, e.g. controller 104. The controller includes a single-ended primary-inductor converter (SEPIC), e.g. SEPIC 114, and a monitoring and switchover circuit, e.g. monitoring and switchover circuit 112. The method includes providing a voltage output of the controller to at least one controller output, e.g. controller outputs 106 and SEPIC output 108. The method includes receiving the voltage output with the low-voltage power supply (LVPS) electrically connected to the at least one controller output. Providing a voltage output of the controller to at least one controller output includes providing the voltage output to the SEPIC output. The method includes monitoring a voltage at the system voltage input with the monitoring and switchover circuit.

Each controller voltage output line includes a respective switch, e.g. switches 118 and 120, connected in series between the controller output or SEPIC output and the LVPS. When a voltage at the system voltage input ranges from 12 to 50V the method comprises feeding the voltage at the system voltage input to the controller voltage output line. When a voltage at the system voltage input is of greater than 50V and up to less than 80V the monitoring and switchover circuit feeds the voltage at the system voltage input to the SEPIC. The method includes converting the voltage at the system voltage input with the SEPIC to generate a fixed 50V output. The method includes connecting the system voltage input during a transient scenario with the monitoring and switchover circuit.

Figure 3:
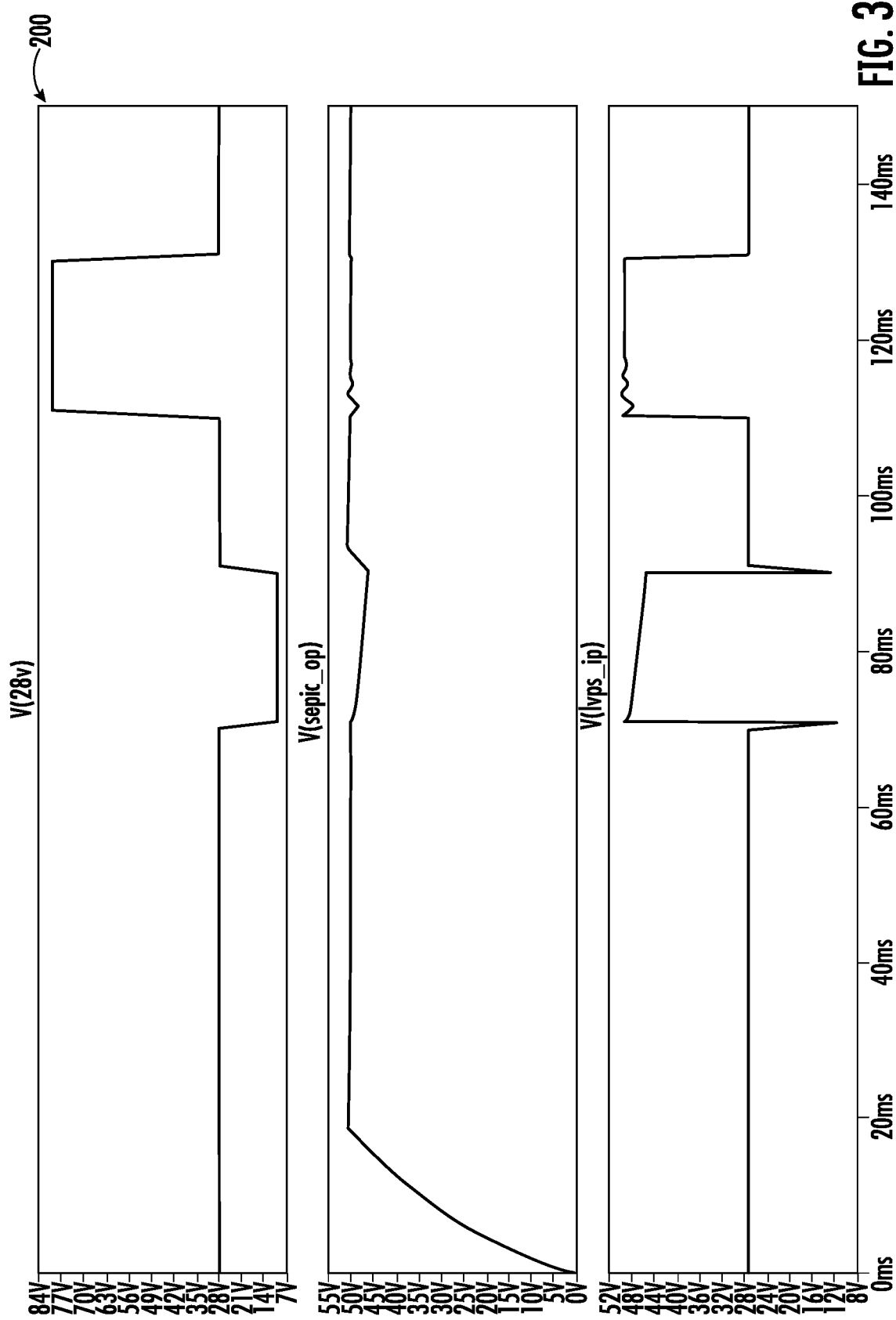
FIG. 3 is a graphical depiction of results of a simulation utilizing the architecture of FIG. 2.

With reference now to FIG. 3, a series 200 of charts show results of a system simulation. A circuit, e.g. similar to the controller 104, is simulated with 28V DC supply with all the transients covering from 12V as low as 10V to 80V and output is loaded with 50 W. The output of controller 104 monitored at SEPIC output 108 and is shown in the middle chart (V(sepic_op)) of FIG. 3. The varying 28V input, e.g. provided at voltage input 102, is shown via the top chart in FIG. 3 (V(28v)). The output to the LVPS, e.g. at LVPS input 126, shown in the bottom chart of FIG. 3 (V(lvps_ip)), is stable and follows the 28V input when the 28V input is within 12V to 50V as the LVPS is supplied through 28V input directly now bypassing the SEPIC output and LVPS input will see this 28V input as it is. At this moment, the SEPIC will be just charging a capacitor, e.g. storage capacitor 116, and stays at 50V. If the 28V input goes less than 12V, or power interrupts in the 28V input, immediately the input monitoring and switchover circuit connects the SEPIC output to LVPS input, whereas 28V input is disconnected to the LVPS input. And this power remains until the capacitor discharges; the discharging time depends on the hold-up time and the selected capacitor size. The storage capacitor at the voltage output line 122 to store energy can be chosen based on the hold-up time requirement based on the equipment category. Once the power regains and greater than 12V, the SEPIC output 108 connected to the LVPS input 126 will get disconnected and 28V input will be connected to the LVPS. Even at the moment if the 28V input goes beyond 50V, which can happen especially at 80V transient for 100 ms, the voltage monitor circuit disconnects the 28V input to the LVPS by turning OFF the 28V supply and connects the 50V output from SEPIC to the LVPS input by turning ON the switch, e.g. switch 118, between SEPIC output and LVPS input. Hence the input voltage to LVPS is always between 12 to 50V irrespective of any variation in the 28V supply. The architecture of system 100 not only boosts the voltage for the purpose of storage and providing the required hold up time, this circuit also monitors the 28V input, e.g. input at voltage input 102, and provides the regulated output at the LVPS input irrespective of various abnormalities such as transients and power interrupts in the 28V input.

Those skilled in the art will readily appreciate that reference characters in FIGS. 1-2 beginning with C (capacitor), e.g. C1, C2, D (diode), e.g., D1, D2, L (inductor), e.g. L2, R (resistor), e.g., R1, R2, Q (transistor), e.g. Q1, Q2, M (MOSFET), e.g. M2, M3, U (integrated circuits), e.g. U3, U4, represent the positions and connections of capacitors, diodes, inductors, resistors, transistors, MOSFETs, integrated circuits and the like. The reference characters used align with the convention for showing these components as understood by one skilled in the art.

The methods and systems of the present disclosure, as described above and shown in the drawings, provide for simpler and more cost-effective front-end architecture with superior properties including short-circuit protection and transient handling capability. This front-end architecture can be used with any of the aircraft sub-system LVPS. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A front-end architecture system comprising:
a system voltage input; and
a controller electrically connected to the system voltage input, wherein the controller is configured to provide a voltage output to at least one controller output, wherein the controller includes:
a single-ended primary-inductor converter (SEPIC); and
an input monitoring and switchover circuit that includes at least one NPN transistor and at least one PNP transistor configured to be used for sensing an input voltage and turn ON/OFF at least one series pass MOSFET.

2. The system as recited in claim 1, wherein:
the at least one controller output includes two controller outputs;
one of the two controller outputs is a SEPIC output; and
the SEPIC output is electrically coupled to a storage capacitor.

3. The system as recited in claim 2, wherein the SEPIC output is electrically connected to a series pass switch through which a SEPIC output voltage is configured to be provided to a low-voltage power supply (LVPS).

4. The system as recited in claim 1, wherein:
the at least one controller output includes two controller outputs;
a specified one of the two controller outputs is in electrical communication with a voltage output line; and
the voltage output line includes a switch connected in series between the specified controller output and a low-voltage power supply (LVPS) input.

5. The system as recited in claim 4, wherein the switch is in electrical communication with the monitoring and switchover circuit between the system voltage input and the at least one controller output.

6. The system as recited in claim 1, wherein the monitoring and switchover circuit is electrically coupled to the system voltage input to monitor the input voltage at the system voltage input.

7. The system as recited in claim 1, wherein the monitoring and switchover circuit is configured to feed the input voltage at the system voltage input ranging from 12V to 50V to a low-voltage power supply (LVPS).

8. The system as recited in claim 1, wherein the monitoring and switchover circuit is configured to feed the input voltage at the system voltage input of greater than 50V and less than 80V to the SEPIC.

9. The system as recited in claim 1, wherein the monitoring and switchover circuit is configured to disconnect the system voltage input during a transient scenario.

10. The system as recited in claim 9, wherein the transient scenario includes when the input voltage at the system voltage input is below 12 volts or is 80 volts or greater.

11. The system as recited in claim 1, wherein the SEPIC includes a SEPIC controller, a MOSFET electrically connected to a modulated output of the SEPIC controller, an inductor electrically connected downstream from the MOSFET, and a diode downstream from the inductor.

12. A method comprising:
receiving an input voltage at a system voltage input with a controller, wherein the controller includes:
a single-ended primary-inductor converter (SEPIC); and
an input monitoring and switchover circuit that includes at least one NPN transistor and at least one PNP transistor configured to be used for sensing the input voltage and turn ON/OFF at least one series pass MOSFET;
providing a voltage output of the controller to at least one controller output; and
providing the voltage output to a low-voltage power supply (LVPS) electrically connected to the at least one controller output.

13. The method as recited in claim 12, wherein;
the at least one controller output includes a SEPIC output; and
the SEPIC output is electrically coupled to a storage capacitor.

14. The method as recited in claim 12, wherein:
the at least one controller output includes a SEPIC output; and
providing the voltage output of the controller to the at least one controller output includes providing the voltage output to the SEPIC output.

15. The method as recited in claim 12, further comprising monitoring the input voltage at the system voltage input with the monitoring and switchover circuit.

16. The method as recited in claim 12, wherein:
the at least one controller output is in electrical communication with a controller voltage output line;
the controller voltage output line includes a switch connected in series between the at least one controller output and the LVPS; and
when the input voltage at the system voltage input ranges from 12V to 50V, the method further comprises feeding the input voltage at the system voltage input to the controller voltage output line.

17. A method comprising:
receiving an input voltage at a system voltage input with a controller, wherein the controller includes a single-ended primary-inductor converter (SEPIC) and a monitoring and switchover circuit;
providing a voltage output of the controller to at least one controller output; and
providing the voltage output to a low-voltage power supply (LVPS) electrically connected to the at least one controller output;
wherein, when the input voltage at the system voltage input is greater than 50V and less than 80V, the monitoring and switchover circuit feeds the input voltage at the system voltage input to the SEPIC.

18. The method as recited in claim 17, further comprising converting the input voltage at the system voltage input with the SEPIC to generate a fixed 50V output.

19. The method as recited in claim 18, further comprising disconnecting the system voltage input during a transient scenario with the monitoring and switchover circuit.

20. The method as recited in claim 12, wherein the at least one controller output is a SEPIC output electrically connected to a series pass switch through which a SEPIC output voltage is configured to be provided to the LVPS.

* * * * *